United States Patent
Li et al.

(10) Patent No.: US 10,044,849 B2
(45) Date of Patent: Aug. 7, 2018

(54) SCALABLE AVATAR MESSAGING

(71) Applicant: INTEL CORPORATION, Santa Clara, CA (US)

(72) Inventors: Wenlong Li, Beijing (CN); Xiaofeng Tong, Beijing (CN); Yangzhou Du, Beijing (CN); Thomas Sachson, Menlo Park, CA (US); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 13/976,037

(22) PCT Filed: Mar. 15, 2013

(86) PCT No.: PCT/CN2013/072679
§ 371 (c)(1),
(2) Date: Nov. 6, 2013

(87) PCT Pub. No.: WO2014/139142
PCT Pub. Date: Sep. 18, 2014

(65) Prior Publication Data
US 2014/0267544 A1 Sep. 18, 2014

(51) Int. Cl.
*H04M 1/72* (2006.01)
*H04M 1/725* (2006.01)
*H04N 7/14* (2006.01)
*H04N 7/15* (2006.01)
*G06K 9/00* (2006.01)

(52) U.S. Cl.
CPC .... *H04M 1/72544* (2013.01); *G06K 9/00315* (2013.01); *H04N 7/141* (2013.01); *H04N 7/157* (2013.01)

(58) Field of Classification Search
USPC ...................................... 348/14.02
See application file for complete search history.

(56) References Cited

U.S. PATENT DOCUMENTS 6,504,546 B1 * 1/2003 Cosatto .................. G06T 13/40
345/473
2005/0280660 A1 * 12/2005 Seo et al. ...................... 345/629
(Continued)

FOREIGN PATENT DOCUMENTS

CN       1996344 A       7/2007
CN       102221886 A     10/2011
(Continued)

OTHER PUBLICATIONS

M. Boker, J. F. Cohn, B.-J. Theobald, I. Matthews, T. R. Brick and J. R. Spiesaff "Effects of damping head movement and facial expression in dyadic conversation using real-time facial expression tracking and synthesized avatars", Philosoph. Transo B Roy. Soc., vol. 364, No. 1535, pp. 3485-3495 Dec. 2009.*
(Continued)

*Primary Examiner* — Amal Zenati
(74) *Attorney, Agent, or Firm* — Barnes & Thornburg LLP

(57) ABSTRACT

Technologies for distributed generation of an avatar with a facial expression corresponding to a facial expression of a user include capturing real-time video of a user of a local computing device. The computing device extracts facial parameters of the user's facial expression using the captured video and transmits the extracted facial parameters to a server. The server generates an avatar video of an avatar having a facial expression corresponding to the user's facial expression as a function of the extracted facial parameters and transmits the avatar video to a remote computing device.

23 Claims, 7 Drawing Sheets

(56) References Cited

U.S. PATENT DOCUMENTS

| | | | |
|---|---|---|---|
| 2008/0158334 A1* | 7/2008 | Reponen | G10L 15/26 348/14.02 |
| 2009/0158150 A1* | 6/2009 | Lyle | A63F 13/12 715/706 |
| 2009/0158170 A1 | 6/2009 | Narayanan et al. | |
| 2011/0091071 A1* | 4/2011 | Sabe | G06K 9/00281 382/103 |
| 2011/0304632 A1 | 12/2011 | Evertt et al. | |
| 2012/0023135 A1 | 1/2012 | Dahlkvist et al. | |
| 2012/0310791 A1 | 12/2012 | Weerasinghe | |
| 2013/0201187 A1 | 8/2013 | Tong et al. | |
| 2014/0007257 A1* | 1/2014 | Dougherty | G09B 5/062 726/28 |
| 2014/0176662 A1* | 6/2014 | Goodman | H04W 4/21 348/14.07 |
| 2014/0218459 A1* | 8/2014 | Wenlong | H04N 21/4223 348/14.01 |

FOREIGN PATENT DOCUMENTS

| | | |
|---|---|---|
| CN | 102640167 A | 8/2012 |
| KR | 1020090022786 A | 3/2009 |
| KR | 1020120018479 A | 3/2012 |
| TW | 201303747 A1 | 1/2013 |
| WO | 03073322 A1 | 9/2003 |
| WO | 2009098671 A2 | 8/2009 |
| WO | 2010037956 A1 | 4/2010 |
| WO | 2012139276 A1 | 10/2012 |
| WO | 2013020247 A1 | 2/2013 |
| WO | 2013097139 A1 | 7/2013 |
| WO | 2013152455 A1 | 10/2013 |

OTHER PUBLICATIONS

Avatar Chat, "Avatar Chat City," <http://www.avatar-chat.net>, Oct. 15, 2012, 1 page.

Avatar Chat, "Avatar Chat—User Help Section," <http://www.avatar-chat.net/help/index.php>, Apr. 28, 2012, 5 pages.

Hütter, "Visual Chat," <http://visualchat.weirdoz.org>, Sep. 17, 2012, 2 pages.

Gaudin, "Intel exec envisions a future of Avatar Chats," Computerworld, <http://www.computerworld.com/s/article/9231253/Intel_exec_envisions_a_future_of_Avatar_Chats>, Sep. 13, 2012, 2 pages.

Fingas, "Sony takes SOEmote live for EverQuest II, lets gamers show their true CG selves (video)," retrieved from: <http://www.engadget.com/2012/08/07/sony-takes-soemote-live-for-everquest-ii>, Aug. 7, 2012, 3 pages.

Ahlberg, "Candide—a parameterized face," retreived from: <http://www.icg.isy.liu.se/candide/main.html>, May 24, 2012, 3 pages.

Saragih et al., "Real-time Avatar Animation from a Single Image," 2011 IEEE International Conference on Automatic Face & Gesture Recognition and Workshops (FG 2011), 2011, pp. 117-124.

Cootes et al., "Statistical Models of Appearance for Computer Vision," Mar. 8, 2004, 125 pages.

Baker et al., "Lucas-Kanade 20 Years On: A Unifying Framework," International Journal of Computer Vision 56(3), pp. 221-255.

Chai et al, "Vision-based Control of 3D Facial Animation," SCA '03 Proceedings of the 2003 ACM SIGGRAPH/Eurographics Symposium on Computer Animation, 2003, 15 pages.

"Dijkstra's algorithm," Wikipedia, The Free Encyclopedia, retrieved from: <http://en.wikipedia.org/w/index.php?title=Dijkstre%27s_algorithm&oldid=508270697>, edited Aug. 20, 2012, 7 pages.

"k-d tree, Wikipedia," The Free Encyclopedia, retrieved from: <http://en.wikipedia.org/w/index.php?title=K-d_tree&oldid=506370749">, edited Aug. 8, 2012, 8 pages.

U.S. Appl. No. 13/976,039, filed Jun. 26, 2013, 33 pages.

International Search Report and Written Opinion received for PCT Patent Application No. PCT/CN2013/072594, dated Dec. 26, 2013, 12 pages.

International Search Report and Written Opinion received for PCT Patent Application No. PCT/CN2013/072679, dated Dec. 19, 2013, 14 pages.

U.S. Appl. No. 13/997,271, filed Jun. 23, 2013, 33 pages.

* cited by examiner

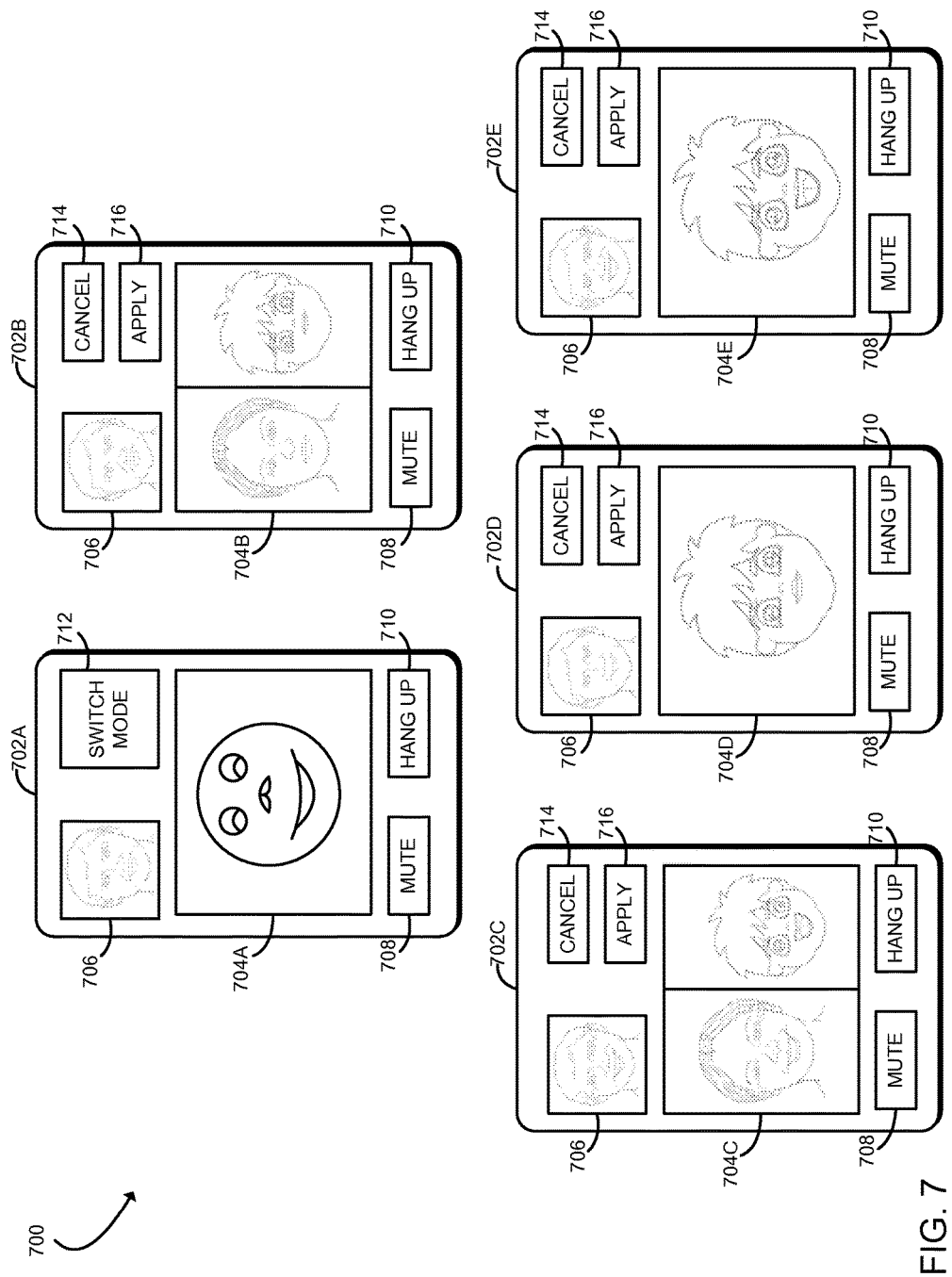

SCALABLE AVATAR MESSAGING

BACKGROUND

Avatars are becoming an integral part of how we communicate with one another in a digital world. The potential uses for avatars range from increased immersion of a player into a role-playing video game environment to protecting a person's privacy when engaged in remote video chat. In any case, advances in technology and computing algorithms enhance the realism of communication via an avatar. Avatars in video games allow users to control the facial gestures of mystical creatures and characters with their own facial expressions. Also, in the context of remote video chat, advanced avatars are nearly indistinguishable from actual real-time video of the user.

Although advances in technology typically unleash endless possibilities and near-reality experiences, it comes at a cost. The computational resources typically required for video editing and rendering are considerable, particularly when it comes to rendering life-like video and motion. For example, many applications require devices to have significant graphical processing capabilities and dedicated memory, which results in substantial power consumption and thus hurts battery life. Naturally, as the number of avatars being independently rendered on a screen increases, so too does the computational overhead. As such, low-power mobile computing devices such as mobile phones typically have poor performance in rendering multiple avatars simultaneously.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 7 is a simplified block diagram of various embodiments of a user interface of the computing device of the system of FIG. 1.

DETAILED DESCRIPTION OF THE DRAWINGS

Figure 1:
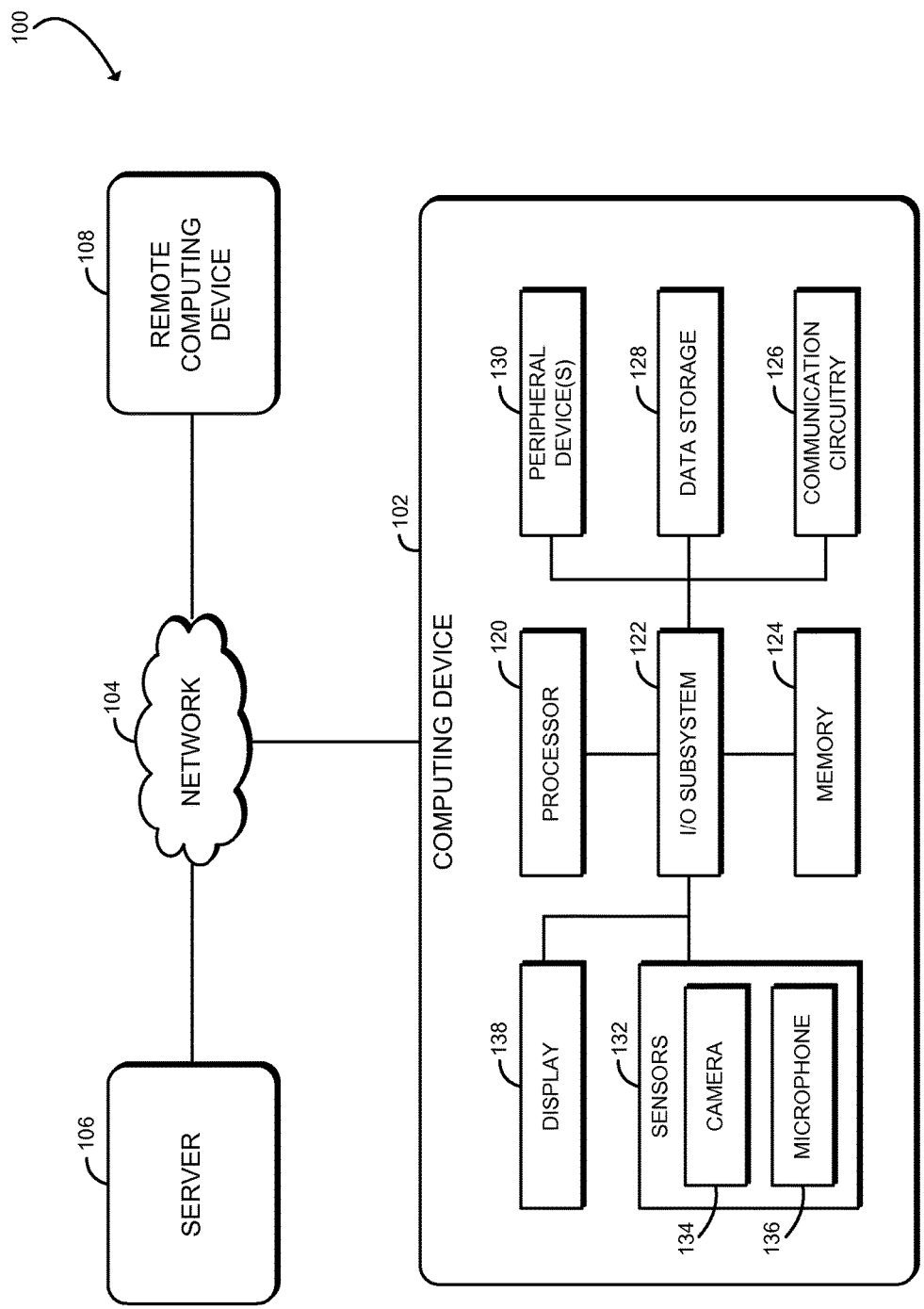
FIG. 1 is a simplified block diagram of at least one embodiment of a system for distributed generation of an avatar with a facial expression corresponding to a facial expression of a user.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for distributed generation of an avatar with a facial expression corresponding to a facial expression of a user includes a computing device 102, a network 104, a server 106, and a remote computing device 108. In use, as discussed in more detail below, the computing device 102 may share or distribute avatar generation between itself and the server 106. After generation, the avatar having a facial expression corresponding to a facial expression of a user of the computing device 102 may be transmitted to the remote computing device 108 (e.g., for avatar-based video chat). Although only one computing device 102, one network 104, one server 106, and one remote computing device 108 are illustratively shown in FIG. 1, the system 100 may include any number of computing devices 102, networks 104, servers 106, and remote computing devices 108. For example, the system 100 may include several remote computing devices 108 utilizing the same server 106 to facilitate avatar generation (e.g., in an avatar-based multi-party video conference or in a role-playing video game).

The computing device 102 may be embodied as any type of computing device capable of establishing a communication link with the server 106 and performing the functions described herein. For example, the computing device 102 may be embodied as a cellular phone, smartphone, tablet computer, laptop computer, personal digital assistant, mobile Internet device, desktop computer, server, and/or any other computing/communication device. As shown in FIG. 1, the illustrative computing device 102 includes a processor 120, an input/output ("I/O") subsystem 122, a memory 124, a communication circuitry 126, a data storage 128, one or more peripheral devices 130, one or more sensors 132, and a display 138. Of course, the computing device 102 may include other or additional components, such as those commonly found in a typical computing device (e.g., various input/output devices), in other embodiments. Additionally, in some embodiments, one or more of the illustrative components may be incorporated in, or otherwise from a portion of another component. For example, the memory 124, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The communication circuitry 126 of the computing device 102 may be embodied as any communication circuit, device, or collection thereof, capable of enabling communications between the computing device 102 and other remote devices (e.g., the server 106) over the network 104. The communication circuitry 126 may be configured to use any one or more communication technologies (e.g., wireless or wired communications) and associated protocols to effect such communication.

The data storage 128 may be embodied as any type of device or devices configured for short-term or long-term storage of data such as, for example, memory devices and circuits, memory cards, hard disk drives, solid-state drives, or other data storage devices. The one or more peripheral devices 130 of the computing device 102 may include any number of additional peripheral or interface devices. The particular devices included in the peripheral devices 130 may depend on, for example, the type and/or intended use of the computing device 102.

The sensors 132 may collect data regarding a user of the computing device 102. As such, the sensors 132 may be embodied as, or otherwise include, for example, proximity sensors, optical sensors, light sensors, audio sensors, temperature sensors, motion sensors, piezoelectric sensors, and/or other types of sensors. In the illustrative embodiment of FIG. 1, the sensors 132 include a camera 134 and a microphone 136. The camera 134 may be embodied as any peripheral or integrated device suitable for capturing images, such as a still camera, a video camera, a webcam, or other device capable of capturing video and/or images. The camera 134 may be used to capture images of the user's various facial expressions (e.g., a reference facial expression, a neutral facial expression, or real-time facial expression). Of course, in some embodiments, multiple cameras 134 may be used to capture images of the user, for example, from different perspectives. The microphone 136 may be embodied as any peripheral or integrated device suitable for capturing audio. The microphone 136 may be used to capture spoken input from a user of the computing device 102 (e.g., in an avatar-based chat or a role-playing game).

The display 138 of the computing device 102 may be embodied as any one or more display screens on which information may be displayed to a viewer of the computing device 102. The display may be embodied as, or otherwise use, any suitable display technology including, for example, a liquid crystal display (LCD), a light emitting diode (LED) display, a cathode ray tube (CRT) display, a plasma display, and/or other display technology. Although only a single display 138 is illustrated in FIG. 1, it should be appreciated that the computing device 102 may include multiple displays or display screens on which the same or different content may be displayed contemporaneously or sequentially with each other.

The network 104 may be embodied as any number of various wired and/or wireless telecommunication networks. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), or any combination thereof.

The server 106 and/or the remote computing device 108 may be embodied as any type of computing device or server capable of performing the functions described herein. For example, in some embodiments, the server 106 and/or the remote computing device 108 may be similar to the computing device 102 as described above. That is, the server 106 and/or the remote computing device 108 may be embodied as an enterprise-level server computer, a desktop computer, a laptop computer, a tablet computer, a cellular phone, smartphone, personal digital assistant, mobile Internet device, and/or any other computing/communication device. Further, the server 106 and/or the remote computing device 108 may include components similar to those of the computing device 102 discussed above. The description of those components of the computing device 102 is equally applicable to the description of components of the server 106 and/or the remote computing device 108 and is not repeated herein for clarity of the description. Further, it should be appreciated that the server 106 and/or the remote computing device 108 may include other components, sub-components, and devices commonly found in a computing device or server, which are not discussed above in reference to the computing device 102 and not discussed herein for clarity of the description. In one embodiment, the computing device 102 and the remote computing device 108 are low-power computing devices that utilize the server 106 to offload some or all of the avatar generation computations.

Figure 2:
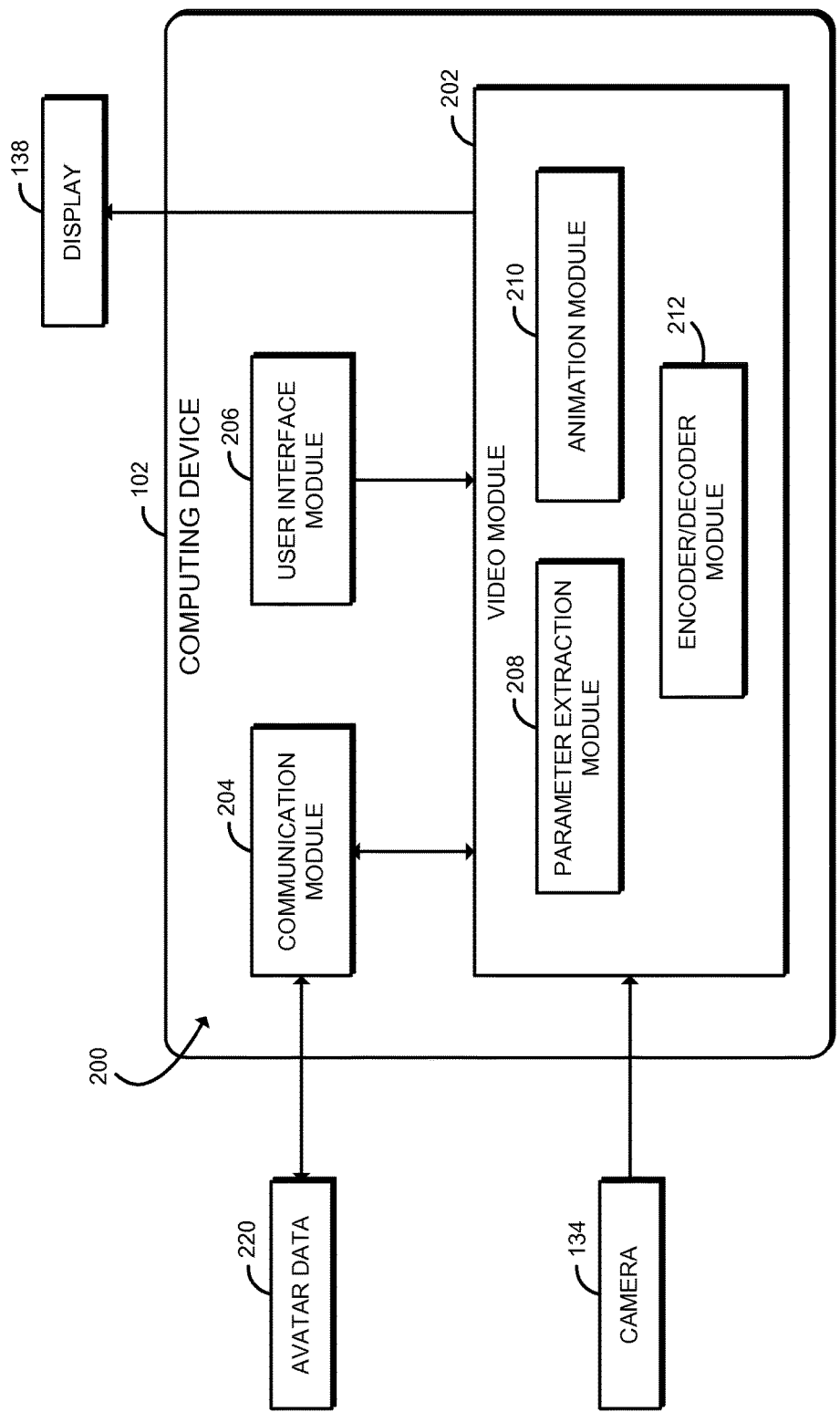
FIG. 2 is a simplified block diagram of at least one embodiment of an environment of the computing device of the system of FIG. 1.

Referring now to FIG. 2, in use, the computing device 102 of the system 100 establishes an environment 200 for distributed generation of an avatar with a facial expression corresponding to a facial expression of a user. The environment 200 in the illustrative embodiment includes a video module 202, a communication module 204, and a user interface module 206. Additionally, the video module 202 further includes a parameter extraction module 208, an animation module 210, and an encoder/decoder module 212. Each of the video module 202, the communication module 204, the user interface module 206, the parameter extraction module 208, the animation module 210, and the encoder/decoder module 212 may be embodied as hardware, software, firmware, or a combination thereof.

As discussed in more detail below, the video module 202 receives images or video of a user (e.g., from the camera 134), extracts facial parameters of the user's facial expressions as shown in the images, and transmits the extracted facial parameters to the server 106 for further computation and forwarding to the remote computing device 108. Additionally, the video module may receive avatar data 220 (i.e., data used to render an avatar) from the server 106 or the remote computing device 108 (e.g., via the communication module 204) associated with an avatar of a remote user and render the avatar on the display 138 of the computing device 102. In some embodiments, the video module 202 displays the real-time video of the user on the display 138 and may also indicate on the display 138 whether the facial parameters are being extracted in real-time (e.g., by marking the boundary of the user's facial expression on the display 138). That is, the video module 202 may indicate to the user when the facial features of the user's expression are not detectable (e.g., due to poor lighting, face angle, etc.).

In doing so, the parameter extraction module 208 extracts various facial parameters from the images associated with the user's facial expression. That is, the camera 134 may capture real-time video of the user's of the computing device 102 and transmit the video data to the video module 202. It should be appreciated that the parameter extraction module 208 may extract the facial parameters of the user's facial expression using any suitable feature or parameter extraction algorithm or process. In doing so, in some embodiments, the parameter extraction module 208 analyzes each frame (or image) of the captured video independently to extract the facial parameters. For example, the feature or parameter extraction algorithm may identify facial landmarks, edges, and/or corners, and the algorithm may utilize face detection and tracking, landmark detection and tracking, face gesture computation, and/or facial motion mapping. In another embodiment, however, more than one frame or image of the captured video may be analyzed in conjunction with one another to extract the facial parameters. As discussed above, the extracted facial parameters may be transmitted to the server 106 for further computation (e.g., generating an avatar as a function of the extracted facial parameters). Of course, as discussed below, the computing device 102 may transmit the video stream to the server 106 for analysis and generation of the avatar video without extracting the facial parameters of the user's facial expression. In other words, the computing device 102 may offload all of the computationally intensive processes to the server 106.

Of course, in some embodiments, the computing device 102 is able to generate an avatar with a facial expression corresponding to a facial expression of a user without offloading any of the computation intensive tasks to the server 106. As such, in some embodiments, the animation module 210 generates an avatar with a facial expression corresponding to the facial expression of a user as a function of the extracted facial parameters. In other words, the animation module 210, in essence, maps the user's facial expression to the avatar. In doing so, the animation module 210 may generate modified avatar data based on the extracted facial parameters. The modified avatar data may be, for example, any data suitable for rendering the modified avatar. Additionally, the animation module 210 renders the modified avatar (e.g., as a function of the modified avatar data). That is, in some embodiments, the animation module 210 generates a visual depiction of the modified avatar as a function of the modified avatar data. As discussed above, the data may be analyzed frame-by-frame or as a collection of frames. In any event, the animation module 210 may appropriately order and combine any frames to generate an avatar video corresponding to the captured video of the user's facial expression. The avatar video may be displayed on the display 138 of the computing device 102. Of course, the animation module 210 may also generate the avatars of remote users (e.g., using the modified avatar data received from the server 106 or remote computing device 108 and corresponding to the remote user's facial expression).

The encoder/decoder module 212 encodes and decodes audiovisual data. For example, the encoder/decoder module 212 may encode video from the camera 134 and audio from the microphone 136 to generate a video stream. In some embodiments, the video stream is displayed on the display 138 of the computing device 102 (e.g., for the user to see himself or herself). In another embodiment, the video stream is transmitted to a remote computing device (e.g., the server 106 or the remote computing device 108). As discussed below, in some embodiments, the video stream is transmitted to the server 106 for analysis and generation of the avatar video. In doing so, the computing device 102 is able to offload an of the computationally intensive processes to the server 106 to, for example, save power. Conversely, the encoder/decoder module 212 may also decode a video stream (e.g., for display on the display 138).

The user interface module 206 penults a user of the computing device 102 to interact with the computing device 102. In doing so, the user interface module 206 may generate a graphical user interface for display on the display 138 of the computing device 102. For example, as discussed below, the user interface module 206 may permit the user to switch which avatar represents the user. Additionally, the user interface module 206 may allow the user to switch between displaying the local user's avatar or a remote user's avatar (e.g., corresponding with a remote user in which the local user is communicating) on the display 138. Of course, the user interface generated by the user interface module 206 may include other options not discussed herein for clarity of the description.

The communication module 204 handles the communication between the computing device 102 and remote devices (e.g., the server 106) through the network 104. As such, the communication module 204 may receive data (e.g., images/video of the local or remote avatar or avatar data 220) from the server 106 or other remote device and provide the data to the video module 202. Additionally, in some embodiments, the communication module 204 may transmit the extracted facial parameters to the server 106 for further analysis (e.g., for generation of the avatar video, modified avatar, and/or modified avatar data). As discussed above, the communication module 204 may alternatively transmit the captured video to the server 106 for extraction and analysis. By doing so, the computing device 102 may even further reduce computational overhead.

Figure 3:
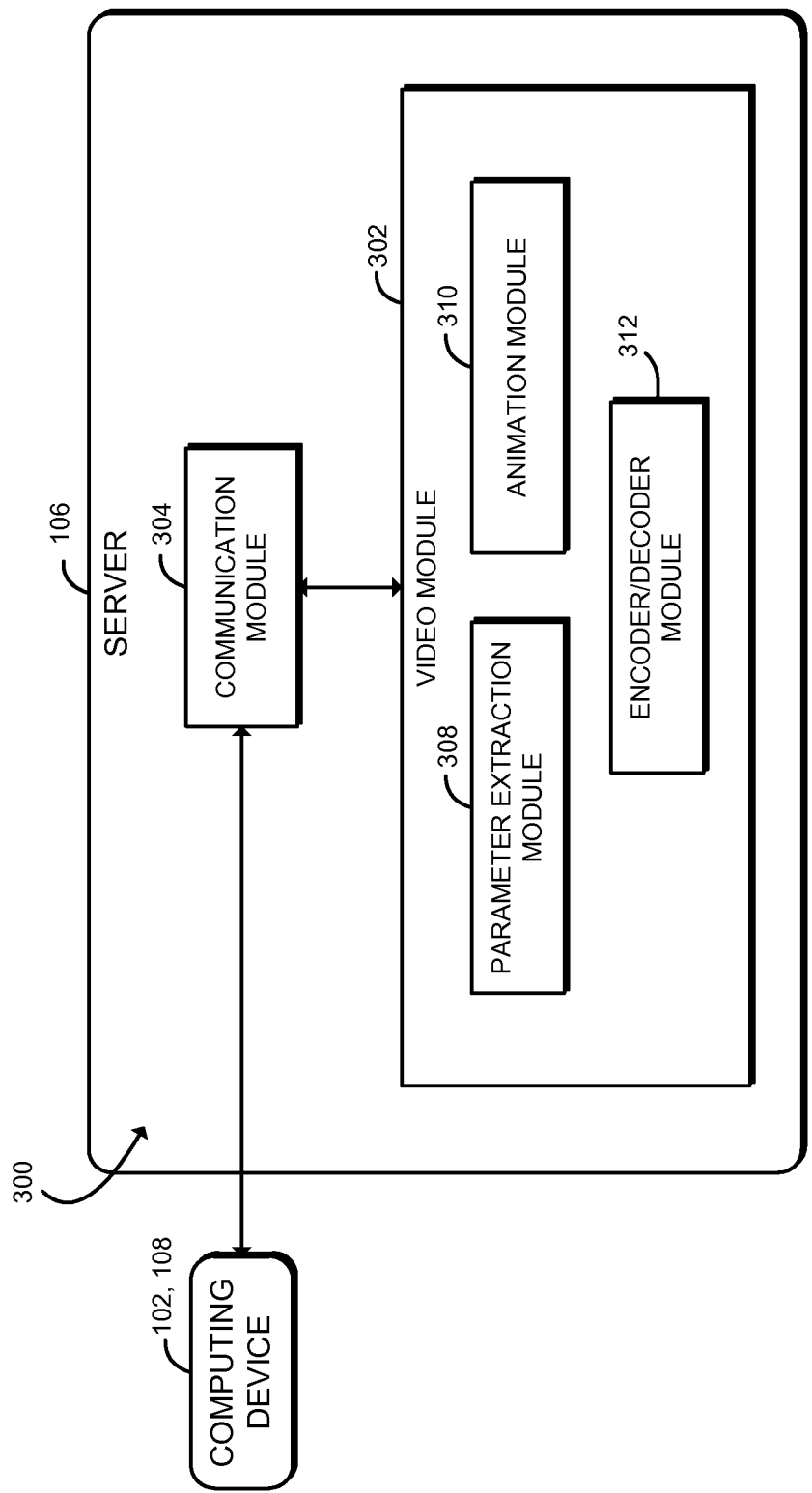
FIG. 3 is a simplified block diagram of at least one embodiment of an environment of the server of the system of FIG. 1.

Referring now to FIG. 3, in use, the server 106 of the system 100 establishes an environment 300 for distributed generation of an avatar with a facial expression corresponding to a facial expression of a user. The environment 300 in the illustrative embodiment includes a video module 302 and a communication module 304. Additionally, the video module 302 further includes a parameter extraction module 308, an animation module 310, and an encoder/decoder module 312. It should be appreciated that the video module 302, the communication module 304, the parameter extraction module 308, the animation module 310, and the encoder/decoder module 312 may be similar to the corresponding modules of the computing device 102. Accordingly, each of the video module 302, the communication module 304, the parameter extraction module 308, the animation module 310, and the encoder/decoder module 312 may be embodied as hardware, software, firmware, or a combination thereof. The description of those modules of the computing device 102 is equally applicable to the description of modules of the server 106 and is not repeated herein for clarity of the description. Further, it should be appreciated that the server 106 may include other modules commonly found in a computing device or server, which are not discussed above in reference to the computing device 102 and not discussed herein for clarity of the description.

As discussed above, the server 106 may receive avatar data 220 from one or both of the computing device 102, 108 for analysis with the video module 302. For example, the server 106 may receive facial parameters from the computing device 102, generate an avatar video based on the received facial parameters, and transmit the avatar video to the remote computing device 108. Alternatively, the server 106 may receive captured video of the user's facial expression from the computing device 102, extract the facial parameters and generate the avatar video, and transmit the avatar video to the remote computing device 108. Of course, in other embodiments, in-between and other schemes of workload partitioning (i.e., the sharing of computational overhead) may be implemented. For example, coarse-grained facial tracking may be performed by the computing device 102 and fine-grained tracking may be performed by the server 106 (e.g., of the mouth and eye area of the user). Additionally, the animation and rendering may also be partitioned between the computing device 102 and the server 106 in various ways depending on the particular implementation. In some embodiments, the server 106 only performs the animation of the modified avatar if the intended recipient of the modified avatar (e.g., the remote computing device 108) is a low-power computing device or has some other relevant attribute; otherwise, the server 106 may simply extract the facial parameters from captured video (if not done by the computing device 102) and transmit the extracted facial parameters to the intended recipient for further analysis.

Figure 4:
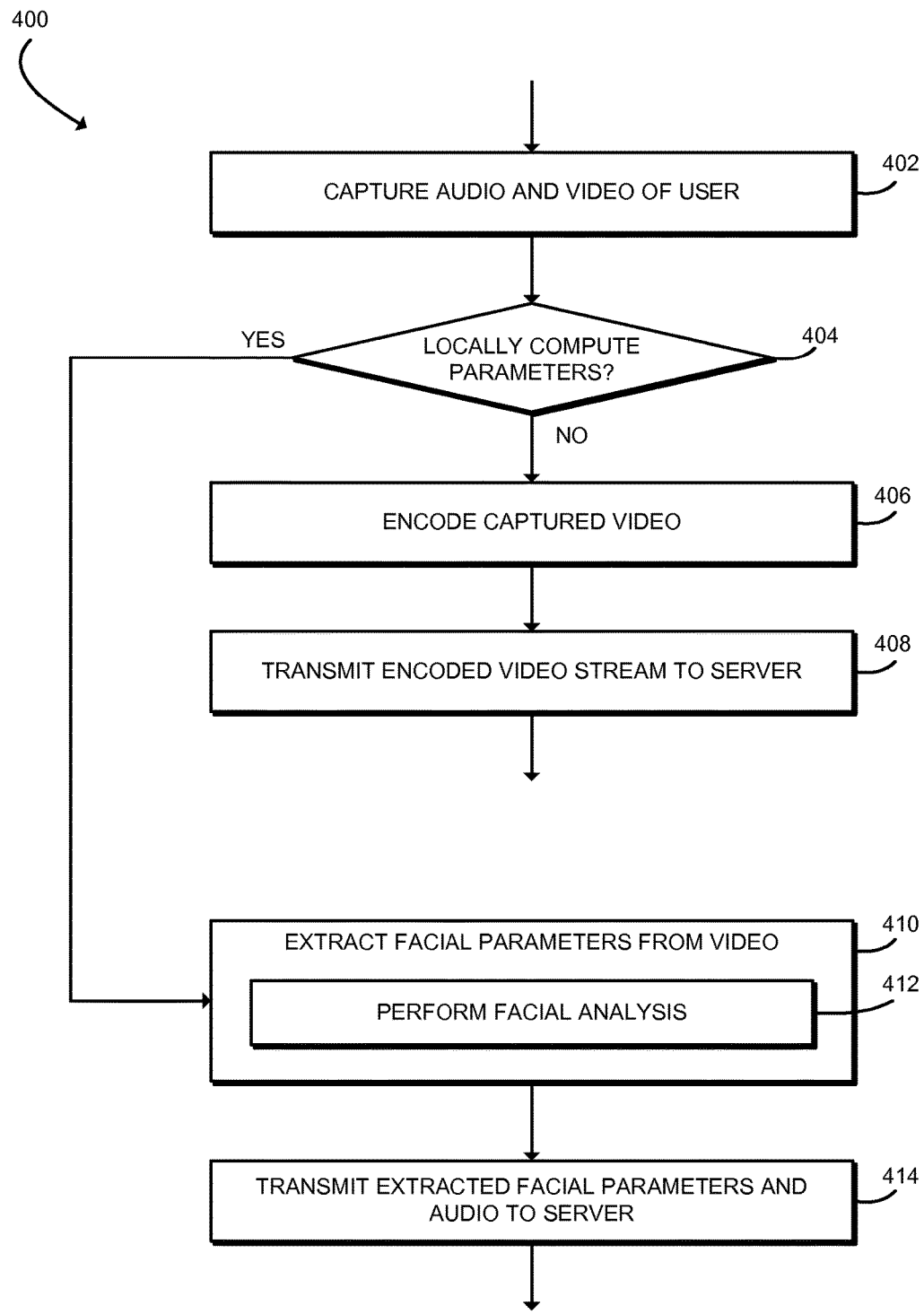
FIG. 4 is a simplified flow diagram of at least one embodiment of a method for distributed generation of an avatar with a facial expression corresponding to a facial expression of a user on the computing device of the system of FIG. 1.

Referring now to FIG. 4, in use, the computing device of the system 100 may execute a method 400 for distributed generation of an avatar with a facial expression corresponding to a facial expression of a user. For example, the user may choose a particular avatar (e.g., using the user interface module 206) or the avatar may be pre-defined for the user. The illustrative method 400 begins with block 402 in which the computing device 102 captures audio and video of the user of the computing device 102 using the camera 134 and the microphone 136. Of course, in some embodiments, only video of the user is captured.

In block 404, the computing device 102 determines whether to locally compute facial parameters of the user's expression represented in the captured video of the user. In making such a determination, the computing device 102 may consider, for example, the processing power and memory of the computing device 102. If not, the computing device 102 encodes the captured video in block 406. In doing so, the computing device 102 may generate a video stream including the captured video and audio. In block 408, the computing device 102 transmits the encoded video stream to the server 106. As discussed below, upon receiving the encoded video stream, the server 106 may decode the video stream, extract the facial parameters of the user's expression represented in the decoded video, generate the avatar video, and transmit the avatar video to the remote computing device 108 for rendering on a display of the remote computing device 108.

If, in block 404, the computing device 102 determines to locally compute facial parameters of the user's expression, the computing device 102 extracts facial parameters of the user's expression represented in the captured video in block 410. In doing so, the computing device 102 may perform a facial analysis of the captured video in block 412. As discussed above, the computing device 102 may use any suitable feature detection or other suitable facial analysis algorithm in extracting the facial parameters. Further, the computing device 102 may analyze each video frame separately to generate facial parameters for each frame/image or analyze a collection of frames together.

In block 414, the computing device 102 transmits the extracted facial parameters and the captured audio to the server 106. In some embodiments, the computing device 102 also processes the captured audio (e.g., to equalize or otherwise transform the audio characteristics). For example, in one embodiment, the captured audio is transformed into an avatar voice. As such, the audio transmitted in block 414 may be the captured audio, post-processed audio, and/or an avatar voice corresponding to the captured audio. Of course, in other embodiments, the captured audio may be transmitted to the server 106, and the server 106 may perform similar post-processing of the audio (e.g., to generate an avatar voice). Further, in some embodiments, regardless of whether the facial parameters are computed locally, the server 106 may transmit a modified avatar (i.e., generated based on the facial parameters) to the computing device 102 for rendering on the display 138, which allows the user to view his or her own avatar in real-time (or near real-time).

Figure 5:
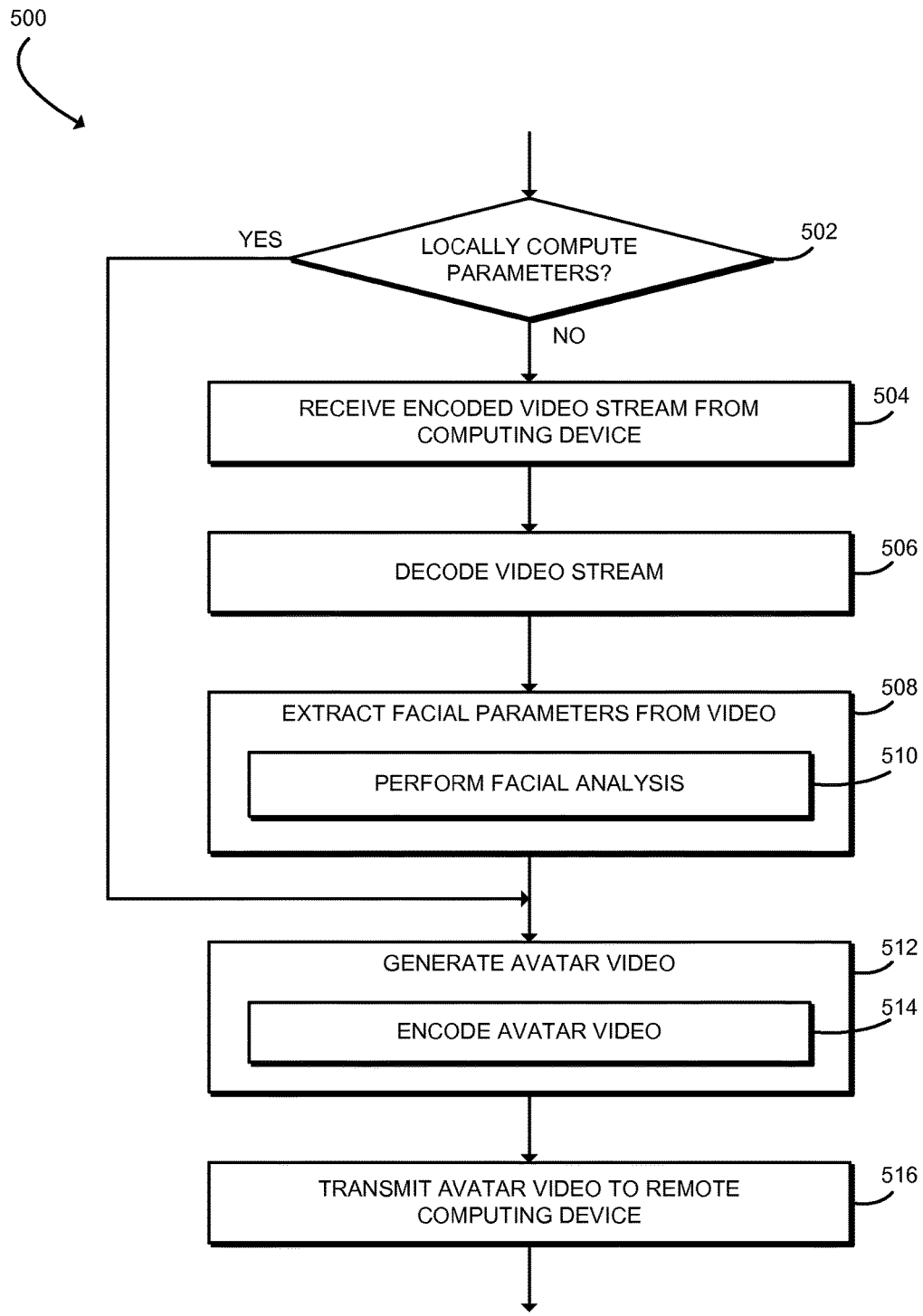
FIG. 5 is a simplified flow diagram of at least one embodiment of a method for distributed generation of an avatar with a facial expression corresponding to a facial expression of a user on the server of the system of FIG. 1.

Referring now to FIG. 5, in use, the server 106 of the system 100 may execute a method 500 for distributed generation of an avatar with a facial expression corresponding to a facial expression of a user. The illustrative method 500 begins with block 502 in which the server 106 determines whether the facial parameters of the facial expression of the user of the computing device 102 have been computed locally on the computing device 102. The server 106 may make such a determination, for example, based on the type of data received from the computing device 102 (e.g., facial parameters or a video stream). If the facial parameters have been extracted or computed locally on the computing device 102, the server 106 generates an avatar video as a function of the facial parameters in block 512. In doing so, the server 106 may generate modified avatar data as discussed above. In some embodiments, the server 106 generates a modified avatar frame for each frame of the captured video of the user.

In other words, the server 106 may generate a "snapshot" of the animated avatar for each frame, which may be combined to generate the avatar video. In block 514, the server 106 may encode the avatar video. For example, the server 106 may encode the modified avatar frames and audio into a video stream to be transmitted to the remote computing device 108. In doing so, the server 106 may use any suitable encoding protocol or algorithm. In block 516, the server 106 transmits the generated avatar video to the remote computing device 108 for display. For example, the server 106 may send an aggregated message to the remote computing device 108 via email, a mobile mass mail application, a web site, a hosting device, or some other transmission medium. Once received, the remote computing device 108 may decode the avatar video and display the avatar on the display of the remote computing device 108. Further, as discussed above, the server 106 may also transmit the avatar video to the computing device 102 for display.

Referring back to block 502, if the server 106 determines that the facial parameters were locally computed, the server 106 receives an encoded video stream, corresponding with the captured video of the user, from the computing device 102 in block 504. In block 506, the server 106 may decode the encoded video stream. As such, in some embodiments, the server 106 generates decoded video frames corresponding to the frames of the captured video of the user of the computing device 102. In block 508, the server 106 extracts facial parameters of the user's facial expression represented in the decoded video. In doing so, the server 106 may perform a facial analysis in block 510. It should be appreciated that in extracting the facial parameters, the server 106 may perform a method similar to that discussed above regarding the computing device 102 (see, for example, block 410 of FIG. 4). The method 500 advances to block 512 in which the server 106 generates the avatar video as discussed above.

Figure 6:
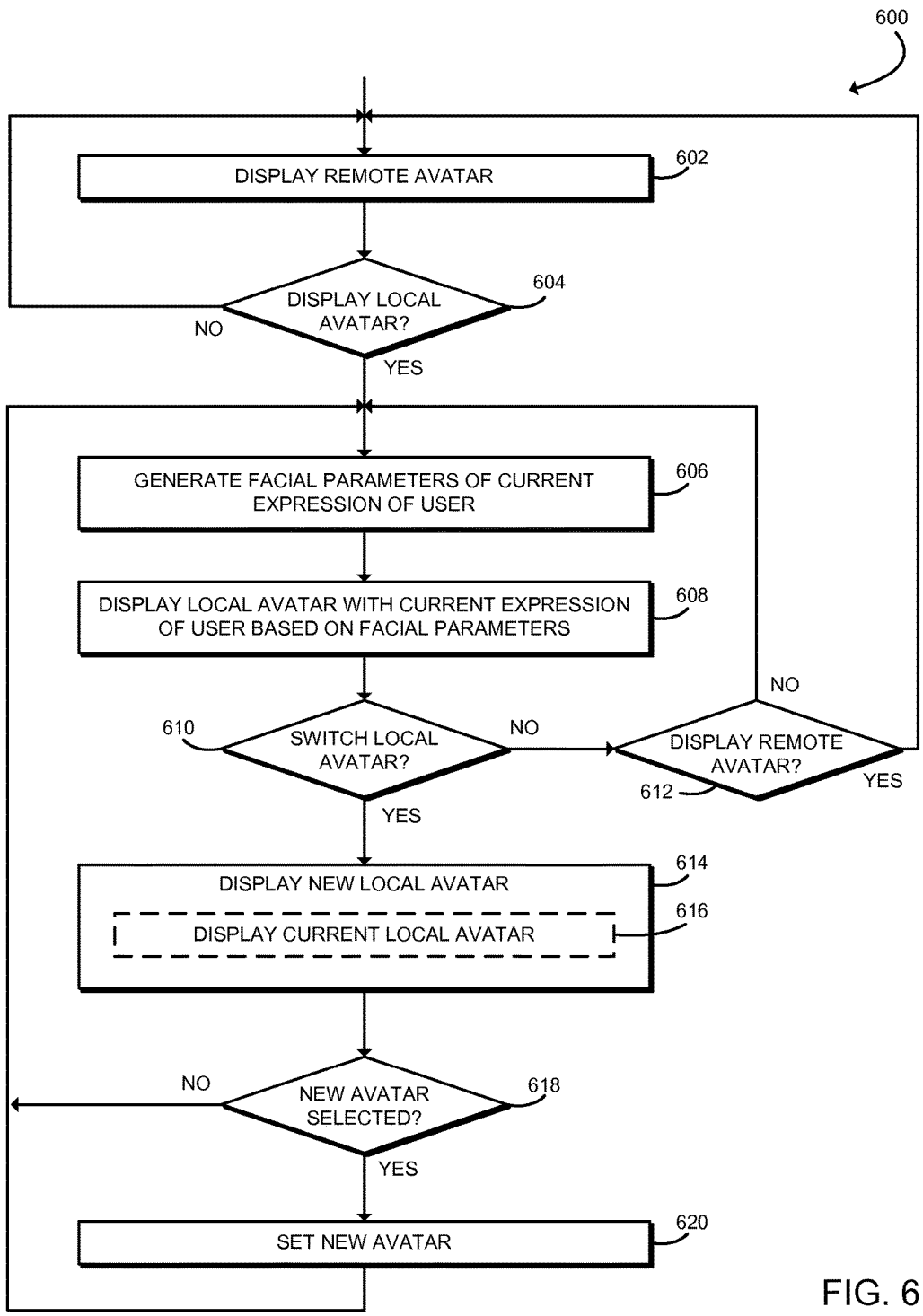
FIG. 6 is a simplified flow diagram of at least one embodiment of a method for facilitating an avatar-based conversation between a local user and a remote user on the computing device of the system of FIG. 1.

Referring now to FIG. 6, in use, the computing device 102 of the system 100 may execute a method 600 for facilitating an avatar-based conversation between a local user of the computing device 102 and a remote user of the remote computing device 108. The illustrative method 600 begins with block 602 in which the computing device 102 displays the remote avatar (i.e., the avatar corresponding to a user of the remote computing device 108). In block 604, the computing device 102 determines whether to display the local avatar (i.e., the avatar corresponding to a user of the computing device 102). In other words, the computing device 102 determines whether to switch from displaying the remote avatar to the local avatar. It should be appreciated that by displaying only one of the remote avatar and the local avatar, the computational overhead and power consumption are significantly reduced.

If the computing device 102 determines to display the local avatar, the computing device 102 generates facial parameters of the current facial expression of the local user in block 606. In block 608, the computing device 102 displays a local avatar with the current expression of the local user based on the facial parameters. In some embodiments, as discussed above regarding the methods 400 and 500, the computing device 102 may rely on the server 106 to generate the facial parameters of the user and/or generate the avatar. In block 610, the computing device 102 determines whether to switch the local avatar. That is, in some embodiments, the user of the computing device 102 may choose an avatar among a collection or gallery of avatars. As such, the user may scroll through the avatars to choose an avatar that the user wants to represent the user. If the computing device 102 determines not to switch the local avatar, the computing device 102 determines whether to display the remote avatar in block 612 (i.e., switch back to displaying the remote avatar). If so, the method 600 returns to block 602 in which the computing device 102 displays the remote avatar. It should be appreciated that in some embodiments the computing device 102 continuously or periodically receives data from the server 106 or the remote computing device 108 corresponding with the real-time remote avatar of the remote user (i.e., to update the remote avatar's expressions in real time).

If computing device 102 determines not to display the remote avatar, the method 600 returns to block 606 in which the computing device 102 generates the facial parameters of the current expression of the user. In other words, the computing device 102 similarly updates the real-time expression of the local user. If, in block 610, the computing device 102 determines to switch the local avatar, the computing device 102 displays a new local avatar in block 614 (e.g., from the gallery of avatars). In some embodiments, the computing device 102 contemporaneously displays the current local avatar 616. This enables the user of the computing device 102 to see both the current and new local avatar at the same time to determine whether the user wants to change the current local avatar. In block 618, the computing device 102 determines whether a new avatar has been selected. If so, the computing device 102 sets the selected avatar as the current avatar in block 620. The method 600 returns to block 606 in which the computing device 102 generates the facial parameters of the current facial expression of the user.

Referring now to FIG. 7, in use, the computing device 102 of the system 100 may generate a graphical user interface for facilitating an avatar-based conversation between a local user of the computing device 102 and a remote user of the remote computing device 108. A collection 700 of graphical user interfaces is illustratively shown in FIG. 7. Five example graphical user interfaces 702A-E illustrate states of the graphical user interface when the computing device 102 is executing the method 600 of FIG. 6. The graphical user interface 702A includes several graphical elements 704A, 706, 708, 710, and 712. It should be appreciated that, depending on the particular embodiment, some of the graphical elements 704A, 706, 708, 710, and 712 may be images whereas others of the graphical elements 704A, 706, 708, 710, and 712 may be text. The graphical element 704A displays a real-time video of the remote avatar. The graphical element 706 displays the real-time captured video of the user of the computing device 102. As discussed above, in some embodiments, the graphical user interface 702A may indicate (e.g., with a boundary marking) whether the facial parameters of the local user are being successfully extracted. The graphical element 708 permits the user to mute the audio of the user (i.e., prevent the audio from being transmitted to the remote computing device 108). The graphical element 710 permits the user to disconnect the communication connection with the remote computing device 108. In other words, the user may "hang up" on the remote user. The graphical element 712 permits the user to switch between displaying the remote avatar and the local avatar in the graphical element 704A. In some embodiments, when the user switches to the local avatar, the graphical user interface 702B is displayed. In other embodiments, a graphical user interface similar to graphical user interfaces 702D and 702E is shown.

The graphical user interface 702B includes the graphical elements 704B, 706, 708, and 710 in addition to graphical elements 714 and 716. The graphical element 704B permits the user to contemporaneously view the current local avatar and at least one other avatar. For example, the user may interact with the graphical element 704B to scroll through the available avatars to select an avatar to represent the user. The graphical element 714 permits the user to cancel the change (e.g., and return to displaying either the current local avatar or the remote avatar depending on the implementation) and the graphical element 716 permits the user to apply the change and set the selected avatar as the current avatar. The graphical user interface 702C illustrates that the graphical element 704C may contemporaneously show at least two avatars (e.g., the user's current avatar and at least one other avatar) with a real-time facial expression corresponding to or mimicking the current facial expression of the user. Once the user selects an avatar, the selected avatar may be displayed without the other avatars. As illustrated by the graphical elements 704D and 704E of graphical user interfaces 702D and 702E, the user's selected local avatar is shown with a real-time facial expression corresponding to the current facial expression of the user. For example, if the user is smiling, the local avatar will be shown as smiling.

EXAMPLES

Illustrative examples of the technologies disclosed herein are provided below. An embodiment of the technologies may include any one or more, and any combination of, the examples described below.

Example 1 includes a server for distributed generation of an avatar with a facial expression corresponding to a facial expression of a user, the server comprising a communication module to receive, from a first computing device, facial parameters of the user's facial expression represented in captured video of the user; and a video module to generate, as a function of facial parameters an avatar video of an avatar having a facial expression corresponding to the user's facial expression, the communication module further to transmit the generated avatar video to a second computing device different from the first computing device.

Example 2 includes the subject matter of Example 1, and wherein the video module is to extract second facial parameters of second facial expression of the user represented in the captured video in response to receipt of the captured video from the first computing device and generate a second avatar video, as a function of the second facial parameters, of the avatar having a second facial expression corresponding to the second facial expression of the user.

Example 3 includes the subject matter of any of Examples 1 and 2, and wherein the communication module is further to (i) receive, from the second computing device, a remote avatar video of a facial expression of a user of the second computing device and (ii) transmit the remote avatar video to the first computing device.

Example 4 includes the subject matter of any of Examples 1-3, and wherein the communication module is further to receive, from the second computing device, second facial parameters of a facial expression of a user of the second computing device; and the video module is to generate, as a function of the second facial parameters, a remote avatar video of a remote avatar having a facial expression corresponding to the facial expression of the user of the second computing device, and wherein the communication module is further to transmit the remote avatar video to the first computing device.

Example 5 includes the subject matter of any of Examples 1-4, and wherein the communication is further to transmit the generated avatar video to the first computing device.

Example 6 includes a method for distributed generation of an avatar with a facial expression corresponding to a facial expression of a user, the method comprising receiving, with a server and from a first computing device, facial parameters of the user's facial expression corresponding to a captured video of the user; generating, on the server and as a function of the facial parameters, an avatar video of an avatar having a facial expression corresponding to the user's facial expression; and transmitting, from the server, the generated avatar video to a second computing device different from the first computing device.

Example 7 includes the subject matter of Example 6, and further including receiving, with the server and from the first computing device, the captured video of the user; and extracting, on the server, second facial parameters of a second facial expression of the user represented in the captured video in response, and generating, on the server and as a function of the second facial parameters, a second avatar video of the avatar having a second facial expression corresponding to the second facial expression of the user.

Example 8 includes the subject matter of any of Examples 6 and 7, and further including receiving, with the server and from the second computing device, a remote avatar video of a facial expression of a user of the second computing device; and transmitting, from the server, the remote avatar video to the first computing device.

Example 9 includes the subject matter of any of Examples 6-8, and further including receiving, with the server and from the second computing device, second facial parameters of a facial expression of a user of the second computing device; generating, on the server and as a function of the second facial parameters, a remote avatar having a facial expression corresponding to the facial expression of the user of the second computing device; and transmitting, from the server, the remote avatar video to the first computing device.

Example 10 includes the subject matter of any of Examples 6-9, and further including transmitting, from the server, the generated avatar video to the first computing device.

Example 11 includes a computing device comprising a processor; and a memory having stored therein a plurality of instructions that when executed by the processor cause the computing device to perform the method of any of Examples 6-10.

Example 12 includes one or more machine readable storage media comprising a plurality of instructions stored thereon that in response to being executed result in a computing device performing the method of any of Examples 6-10.

Example 13 includes a computing device for distributed generation of an avatar with a facial expression corresponding to a facial expression of a user, the computing device comprising means for receiving, from a first computing device, facial parameters of the user's facial expression corresponding to a captured video of the user; means for generating, as a function of the facial parameters, an avatar video of an avatar having a facial expression corresponding to the user's facial expression; and means for transmitting the generated avatar video to a second computing device different from the first computing device.

Example 14 includes the subject matter of Example 13, and further including means for receiving, from the first computing device, the captured video of the user; means for extracting second facial parameters of a second facial expression of the user represented in the captured video; and generating, as a function of the second facial parameters, a second avatar video of the avatar having a second facial expression corresponding to the second facial expression of the user.

Example 15 includes the subject matter of any of Examples 13 and 14, and further including means for receiving, from the second computing device, a remote avatar video of a facial expression of a user of the second computing device; and means for transmitting the remote avatar video to the first computing device.

Example 16 includes the subject matter of any of Examples 13-15, and further including means for receiving, the second computing device, second facial parameters of a facial expression of a user of the second computing device; means for generating, as a function of the second facial parameters, a remote avatar having a facial expression corresponding to the facial expression of the user of the second computing device; and means for transmitting the remote avatar video to the first computing device.

Example 17 includes the subject matter of any of Examples 13-16, and further including means for transmitting the generated avatar video to the first computing device.

Example 18 includes a computing device for distributed generation of an avatar with a facial expression corresponding to a facial expression of a user, the computing device comprising a camera to capture video of a user's facial expression; a video module to extract: facial parameters of the user's facial expression using the captured video; and a communication module to transmit the extracted facial parameters of the user's facial expression to the server.

Example 19 includes the subject matter of Example 18, and wherein to extract facial parameters of the user's facial expression comprises to perform a facial analysis of the captured video of the user's facial expression.

Example 20 includes the subject matter of any of Examples 18 and 19, and wherein the communication module is to transmit the captured video of the user's facial expression to the server.

Example 21 includes the subject matter of any of Examples 18-20, and wherein the communication module is to receive a remote avatar video corresponding to a facial expression of a user of a remote computing device.

Example 22 includes the subject matter of any of Examples 18-21, and wherein the communication module is further to receive, from the server, a local avatar video generated as a function of the facial parameters of the user's facial expression.

Example 23 includes the subject matter of any of Examples 18-22, and further including a display; and wherein the video module is to (i) permit the user to change a local avatar representing the user's facial expression and (ii) permit the user to switch between the local avatar and a remote avatar for display on the display of the computing device.

Example 24 includes the subject matter of any of Examples 18-23, and wherein the video module is further to display the local avatar video on the display in response to a selection by the user to display the local avatar; and display the remote avatar video on the display in response to a selection by the user to display the remote avatar video.

Example 25 includes the subject matter of any of Examples 18-24, and wherein the video module is further to contemporaneously display a new local avatar and a current local avatar on the display in response to a selection by the user to change the local avatar.

Example 26 includes the subject matter of any of Examples 18-25, and wherein the video module is to contemporaneously display each of the new local avatar and the current local avatar with facial expressions that correspond to a current facial expression of the user.

Example 27 includes the subject matter of any of Examples 18-26, and wherein the video module is to indicate on the display that the real-time facial parameters of the user's facial expression are extracted in response to the extraction of the facial parameters.

Example 28 includes the subject matter of any of Examples 18-27, and wherein to indicate on the display comprises to visually mark a face boundary of the user's facial expression.

Example 29 includes a method for distributed generation of an avatar with a facial expression corresponding to a facial expression of a user, the method comprising capturing, on a computing device, video of a user's facial expression; extracting, on the computing device, the facial parameters of the user's facial expression using the captured video; and transmitting, from the computing device and to the server, the extracted facial parameters of the user's facial expression.

Example 30 includes the subject matter of Example 29, and wherein extracting the facial parameters of the user's facial expression comprises performing a facial analysis of the captured video of the user's facial expression.

Example 31 includes the subject matter of any of Examples 29 and 30, and further including transmitting, from the computing device, the captured video of the user's facial expression to the server.

Example 32 includes the subject matter of any of Examples 29-31, and further including receiving, with the computing device, a remote avatar video corresponding to a facial expression of a user of a remote computing device.

Example 33 includes the subject matter of any of Examples 29-32, and further including receiving, from the server, a local avatar video generated as a function of the facial parameters of the user's facial expression.

Example 34 includes the subject matter of any of Examples 29-33, and further including generating, on the computing device, a user interface to (i) permit the user to change a local avatar representing the user's facial expression and (ii) permit the user to switch between the local avatar and a remote avatar for display on the display of the computing device.

Example 35 includes the subject matter of any of Examples 29-34, and wherein further comprising displaying, on a display the computing device, the local avatar video in response to a selection by the user to display the local avatar; and displaying, on the display, the remote avatar video in response to a selection by the user to display the remote avatar video.

Example 36 includes the subject matter of any of Examples 29-35, and further including contemporaneously displaying, on the computing device, a new local avatar and a current local avatar in response to a selection by the user to change the local avatar.

Example 37 includes the subject matter of any of Examples 29-36, and wherein contemporaneously displaying the new local avatar and the current local avatar comprises contemporaneously displaying the new local avatar and the current local avatar with facial expressions that correspond to a current facial expression of the user.

Example 38 includes the subject matter of any of Examples 29-37, and further including indicating, on the display and in response to the extraction of the facial parameters, that the real-time facial parameters of the user's facial expression are extracted.

Example 39 includes the subject matter of any of Examples 29-38, and wherein indicating that the real-time facial parameters are extracted comprises visually marking a face boundary of the user's facial expression.

Example 40 includes a computing device comprising a processor; and a memory having stored therein a plurality of instructions that when executed by the processor cause the computing device to perform the method of any of Examples 29-39.

Example 41 includes one or more machine readable storage media comprising a plurality of instructions stored thereon that in response to being executed result in a computing device performing the method of any of Examples 29-39.

Example 42 includes a computing device for distributed generation of an avatar with a facial expression corresponding to a facial expression of a user, the computing device comprising means for capturing video of a user's facial expression; means for extracting the facial parameters of the user's facial expression using the captured video; and means for transmitting the extracted facial parameters of the user's facial expression to the server.

Example 43 includes the subject matter of Example 42, and wherein the means for extracting the facial parameters of the user's facial expression comprises means for performing a facial analysis of the captured video of the user's facial expression.

Example 44 includes the subject matter of any of Examples 42 and 43, and further including means for transmitting the captured video of the user's facial expression to the server.

Example 45 includes the subject matter of any of Examples 42-44, and further including means for receiving a remote avatar video corresponding to a facial expression of a user of a remote computing device.

Example 46 includes the subject matter of any of Examples 42-45, and further including means for receiving, from the server, a local avatar video generated as a function of the facial parameters of the user's facial expression.

Example 47 includes the subject matter of any of Examples 42-46, and further including means for generating a user interface to (i) permit the user to change a local avatar representing the user's facial expression and (ii) permit the user to switch between the local avatar and a remote avatar for display on the display of the computing device.

Example 48 includes the subject matter of any of Examples 42-47, and wherein further comprising means for displaying the local avatar video in response to a selection by the user to display the local avatar; and means for displaying the remote avatar video in response to a selection by the user to display the remote avatar video.

Example 49 includes the subject matter of any of Examples 42-48, and further including means for contemporaneously displaying a new local avatar and a current local avatar in response to a selection by the user to change the local avatar.

Example 50 includes the subject matter of any of Examples 42-49, and wherein the means for contemporaneously displaying the new local avatar and the current local avatar comprises a means for contemporaneously displaying the new local avatar and the current local avatar with facial expressions that correspond to a current facial expression of the user.

Example 51 includes the subject matter of any of Examples 42-50, and further including means for indicating, on a display of the computing device and in response to the extraction of the facial parameters, that the real-time facial parameters of the user's facial expression are extracted.

Example 52 includes the subject matter of any of Examples 42-51, and wherein the means for indicating that the real-time facial parameters are extracted comprises means for visually marking a face boundary of the user's facial expression.

Example 53 includes a local computing device for facilitating an avatar-based conversation between a local user and a remote user, the computing device comprising a display; a camera to capture video of the local user's facial expression; a communication module to receive a video of a remote avatar representing the remote user's facial expression; a user interface to (i) permit the local user to change a local avatar representing the local user's facial expression and (ii) permit the local user to switch between the local avatar and the remote avatar for display on the display of the local computing device; and a video module to (i) generate facial parameters of the local user's current facial expression and (ii) display a video of the local avatar having a facial expression corresponding to the local user's current facial expression based on the generated facial parameters in response to a selection by the local user to display the local avatar, and wherein the video module is further to display the video of the remote avatar on the display of the local computing device in response to a selection by the local user to display the remote avatar.

Example 54 includes the subject matter of Example 53, and wherein the video module is to contemporaneously display a new local avatar and a current local avatar on the display in response to a selection by the local user to change the local avatar.

Example 55 includes the subject matter of any of Examples 53 and 54, and wherein the video module is to contemporaneously display each of the new local avatar and the current local avatar with facial expressions that correspond to a current facial expression of the user.

Example 56 includes the subject matter of any of Examples 53-55, and wherein the video module is to indicate on the display whether real-time facial parameters of the local user's facial expression are generated.

Example 57 includes a computing device to facilitate an avatar-based conversation between a local user and a remote user, the computing device comprising a video module to display a graphical user interface comprising a first graphical element to display a real-time video of the local user's facial expression captured from a camera of a computing device; a second graphical element to display an avatar representing one of the local user's facial expression or the remote user's facial expression; a third graphical element to permit the local user to switch between a current local avatar and at least one other local avatar to select an avatar to represent the local user's facial expression; and a fourth graphical element to permit the local user to switch between displaying an avatar representing the local user's facial expression and an avatar representing the remote user's facial expression.

Example 58 includes the subject matter of Example 57, and wherein the first graphical element is further to indicate whether real-time facial parameters of the local user's facial expression are extracted.

The invention claimed is:
1. A server comprising:
a communication module to receive, from a first computing device, determined facial parameters of a facial expression represented in captured video of a user of the first computing device; and a video module to generate, as a function of the determined facial parameters, an avatar video of an avatar having a facial expression corresponding to the users facial expression, wherein to generate the avatar comprises to (i) generate a plurality of modified avatar frames, each modified avatar frame representative of a corresponding frame in the captured video, (ii) generate a snapshot of an animated avatar in each modified avatar frame, and (iii) combine each generated snapshot, the communication module further to (i) transmit, after receipt of the facial parameters, the avatar video to the first computing device and to a second computing device different from the first computing device and (ii) receive an indication from the first computing device of a switch from the avatar video to a remote avatar generated by the server for display on the first computing device.

2. The server of claim 1, wherein the video module is to extract second facial parameters of a second facial expression of the user, different from the determined facial parameters, represented in the captured video in response to receipt of the captured video from the first computing device and generate a second avatar video, as a function of the second facial parameters, of the avatar having a second facial expression corresponding to the second facial expression of the user.

3. The server of claim 1, wherein the communication module is further to (i) receive, from the second computing device, a remote avatar video of a facial expression of a user of the second computing device and (ii) transmit the remote avatar video to the first computing device.

4. The server of claim 1, wherein the communication module is further to receive, from the second computing device, second facial parameters of a facial expression of a user of the second computing device; and the video module is to generate, as a function of the second facial parameters, a remote avatar video of a remote avatar having a facial expression corresponding to the facial expression of the user of the second computing device, and wherein the communication module is further to transmit the remote avatar video to the first computing device.

5. One or more machine-readable storage media comprising a plurality of instructions stored thereon that, in response to execution by a computing device, cause the computing device to:

receive, from a first computing device, determined facial parameters of a facial expression corresponding to a captured video of a user of the first computing device;

generate, as a function of the determined facial parameters, an avatar video of an avatar having a facial expression corresponding to the user's facial expression, wherein to generate the avatar video comprises to: (i) generate a plurality of modified avatar frames, each modified avatar frame representative of a corresponding frame in the captured video, (ii) generate a snapshot of an animated avatar in each modified avatar frame, and (iii) combine each generated snapshot;

transmit, after receipt of the facial parameters, the avatar video to the first computing device and to a second computing device different from the first computing device; and receive an indication from the first computing device of a switch from the avatar video to a remote avatar generated by the computing device for display on the first computing device.

6. The one or more machine-readable storage media of claim 5, wherein the plurality of instructions further cause the computing device to:

receive, from the first computing device, the captured video of the user; and extract second facial parameters of a second facial expression of the user, different from the determined facial parameters, represented in the captured video in response, and generate, as a function of the second facial parameters, a second avatar video of the avatar having a second facial expression corresponding to the second facial expression of the user.

7. The one or more machine-readable storage media of claim 5, wherein the plurality of instructions further cause the computing device to:

receive, from the second computing device, a remote avatar video of a facial expression of a user of the second computing device; and transmit the remote avatar video to the first computing device.

8. The one or more machine-readable storage media of claim 5, wherein the plurality of instructions further cause the computing device to:

receive, from the second computing device, second facial parameters of a facial expression of a user of the second computing device;

generate, as a function of the second facial parameters, a remote avatar having a facial expression corresponding to the facial expression of the user of the second computing device; and transmit the remote avatar video to the first computing device.

9. A computing device comprising:

a display;

a camera to capture video of a facial expression of a user of the computing device;

a video module extract facial parameters of the facial expression using the captured video; and a communication module to (i) transmit the extracted facial parameters of the facial expression to a server and (ii) receive, from the server, a local avatar video generated as a function of the facial parameters of the facial expression, a generation of a plurality of modified avatar frames, each modified avatar frame representative of a corresponding frame in the captured video, a generation of a snapshot of an animated avatar in each modified avatar frame, and a combination of each generated snapshot, wherein the video module is further to (i) permit the user to change the local avatar video and (ii) permit the user to switch between the local avatar video and a remote avatar for display on the display of the computing device.

10. The computing device of claim 9, wherein to extract facial parameters of the user's facial expression comprises to perform a facial analysis of the captured video of the user's facial expression.

11. The computing device of claim 9, wherein the communication module is to transmit the captured video of the user's facial expression to the server.

12. The computing device of claim 9, wherein the communication module is to receive a remote avatar video corresponding to a facial expression of a user of a remote computing device.

13. The computing device of claim 12, wherein the video module is further to:

display the local avatar video on the display in response to a selection by the user to display the local avatar video; and display the remote avatar video on the display in response to a selection by the user to display the remote avatar video.

14. The computing device of claim 9, wherein the video module is further to contemporaneously display a new local avatar and a current local avatar on the display in response to a selection by the user to change the local avatar.

15. The computing device of claim 14, wherein the video module is to contemporaneously display each of the new local avatar and the current local avatar with facial expressions that correspond to a current facial expression of the user.

16. The computing device of claim 9, wherein the video module is to indicate on the display that real-time facial parameters of the user's facial expression are extracted in response to the extraction of the facial parameters.

17. One or more machine-readable storage media comprising a plurality of instructions stored thereon that, in response to execution by a computing device, cause the computing device to:

capture, by a camera of the computing device, a video of a facial expression of a user of the computing device;

extract facial parameters of the facial expression from the captured video;

transmit the extracted facial parameters of the facial expression to a server;

receive, from the server, a local avatar video generated as a function of the facial parameters of the facial expression, a generation of a plurality of modified avatar frames, each modified avatar frame representative of a corresponding frame in the captured video, a generation of a snapshot of an animated avatar in each modified avatar frame, and a combination of each generated snapshot; and permit the user to switch between the local avatar video and a remote avatar of a remote user for display on a display of the computing device.

18. The one or more machine-readable storage media of claim 17, wherein the plurality of instructions further cause the computing device to transmit the captured video of the user's facial expression to the server.

19. The one or more machine-readable storage media of claim 17, wherein the plurality of instructions further cause the computing device to receive a remote avatar video corresponding to a facial expression of a user of a remote computing device.

20. The one or more machine-readable storage media of claim 19, wherein the plurality of instructions further cause the computing device to:

display the local avatar video on the display in response to a selection by the user to display the local avatar video; and display the remote avatar video on the display in response to a selection by the user to display the remote avatar video.

21. The one or more machine-readable storage media of claim 17, wherein the plurality of instructions further cause the computing device to contemporaneously display a new local avatar and a current local avatar on the display in response to a selection by the user to change the local avatar.

22. The one or more machine-readable storage media of claim 21, wherein the plurality of instructions further cause the computing device to contemporaneously display each of the new local avatar and the current local avatar with facial expressions that correspond to a current facial expression of the user.

23. The one or more machine-readable storage media of claim 17, wherein the plurality of instructions further cause the computing device to indicate on the display that real-time facial parameters of the user's facial expression are extracted in response to the extraction of the facial parameters.

* * * * *

UNITED STATES PATENT AND TRADEMARK OFFICE
CERTIFICATE OF CORRECTION

PATENT NO. : 10,044,849 B2
APPLICATION NO. : 13/976037
DATED : August 7, 2018
INVENTOR(S) : Wenlong Li et al.

It is certified that error appears in the above-identified patent and that said Letters Patent is hereby corrected as shown below:

In the Claims

In Claim 1, Column 17, Lines 4-10, replace "(i) generate a plurality of modified avatar frames, each modified avatar frame representative of a corresponding frame in the captured video, (ii) generate a snapshot of an animated avatar in each modified avatar frame, and (iii) combine each generated snapshot" with --(i) generate a plurality of modified avatar frames, each modified avatar frame representative of a corresponding frame in the captured video, wherein to generate the plurality of modified avatar frames comprises to generate a snapshot of an animated avatar in each modified avatar frame and (ii) combine each generated snapshot"--.

In Claim 5, Column 17, Lines 54-59, replace "(i) generate a plurality of modified avatar frames, each modified avatar frame representative of a corresponding frame in the captured video, (ii) generate a snapshot of an animated avatar in each modified avatar frame, and (iii) combine each generated snapshot" with --(i) generate a plurality of modified avatar frames, each modified avatar frame representative of a corresponding frame in the captured video, wherein to generate the plurality of modified avatar frames comprises to generate a snapshot of an animated avatar in each modified avatar frame and (ii) combine each generated snapshot"--.

In Claim 9, Column 18, Lines 44-49, replace "a generation of a plurality of modified avatar frames, each modified avatar frame representative of a corresponding frame in the captured video, a generation of a snapshot of an animated avatar in each modified avatar frame, and a combination of each generated snapshot" with --a generation of a plurality of modified avatar frames, each modified avatar frame representative of a corresponding frame in the captured video, wherein the generation of a plurality of modified avatar frames comprises a generation of a snapshot of an animated avatar in each modified avatar frame, and a combination of each generated snapshot--.

In Claim 17, Column 19, Lines 33-38, replace "a generation of a plurality of modified avatar frames, each modified avatar frame representative of a corresponding frame in the captured video, a generation of a snapshot of an animated avatar in each modified avatar frame, and a combination of each generated snapshot" with --a generation of a plurality of modified avatar frames, each modified Signed and Sealed this
Fifth Day of February, 2019

Andrei Iancu
*Director of the United States Patent and Trademark Office* avatar frame representative of a corresponding frame in the captured video, wherein the generation of a plurality of modified avatar frames comprises a generation of a snapshot of an animated avatar in each modified avatar frame, and a combination of each generated snapshot--.